MAGNETIC RECORDING SYSTEM

Filed June 1, 1954

INVENTORS
Leslie L. Burns, Jr.
& Eugene O. Keizer

BY Morris A. Rabkin
ATTORNEY

United States Patent Office 2,915,594

Patented Dec. 1, 1959

2,915,594

MAGNETIC RECORDING SYSTEM

Leslie L. Burns, Jr., and Eugene O. Keizer, Princeton, N.J., assignors to Radio Corporation of America, a corporation of Delaware

Application June 1, 1954, Serial No. 433,611

8 Claims. (Cl. 179—100.2)

This invention relates to magnetic recording, and more particularly, but not necessarily exclusively, to novel thermal means and method for imparting magnetic impressions corresponding to signal energy on a magnetic record receiving member.

It is known that materials which exhibit paramagnetic properties at ordinary temperatures will undergo certain structural changes when sufficiently heated and will thereby lose their paramagnetic properties. When the materials have again cooled below the critical temperature, the paramagnetic properties again appear. This critical temperature is called the Curie point or Curie temperature. Magnetic materials capable of having magnetic permeability much greater than a vacuum are designated herein as having paramagnetic properties.

It is, accordingly, an object of the present invention to take advantage of this phenomena to provide a method for imparting magnetic impressions on a record receiving member in accordance with applied signals.

It is another object of the present invention to provide a novel method of applying signal modulated radiant energy to a magnetic record receiving member in carrying out a recording procedure.

It is a further object of the present invention to provide means for thermally recording magnetic impressions on a magnetic record receiving member.

In accomplishing these and other objects, there has been provided in accordance with the present invention a novel magnetic recording system and method. A magnetic record receiving member is first magnetized by a suitable magnetizing means such as a permanent magnet. The record receiving member is then heated to approximately the Curie temperature. Modulated radiant energy means are provided for adding the necessary heat to drive the material into the Curie range thereby demagnetizing the material in accordance with the modulation of the radiant energy means leaving a replica of the signal in the form of residual magnetism on the record receiving member.

An understanding of the present invention may be had from the following detailed description when read in connection with the accompanying drawing in which.

Figure 1:
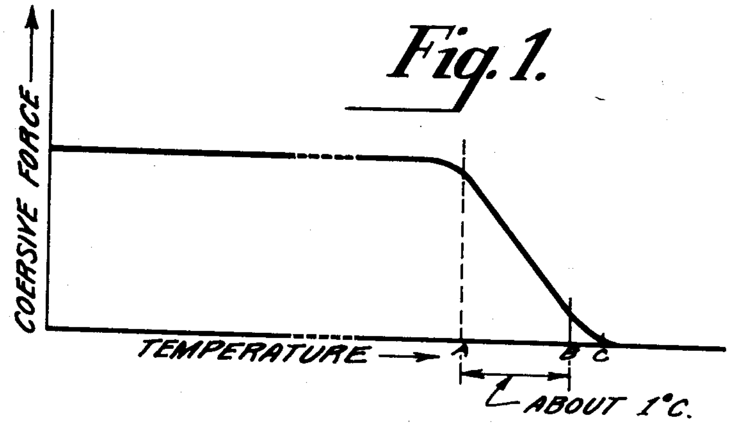
Fig. 1 is a chart showing the relationship between temperature and the coercive force of a paramagnetic material. The range has been foreshortened to show the details of the curve in the Curie range.

Referring now to the drawing in more detail, there is shown in Fig. 1, a curve illustrating the relationship of temperature on the magnetic properties of paramagnetic materials. From normal temperatures up to the Curie point, changes in temperature have substantially no effect upon the magnetic properties of the material. However, when the Curie region is reached, the magnetic properties drop off rapidly to a point at which residual magnetism substantially completely disappears. It may be seen from a curve that most of the heat required would be used in bringing the magnetic material up to the knee of the curve, illustrated as point A on the chart. The operating range for the system, according to the present invention, would be between the points A and B on the curve. This has been determined to embrace a temperature change of about one to two degrees centigrade, depending on the material selected.

Figure 2:
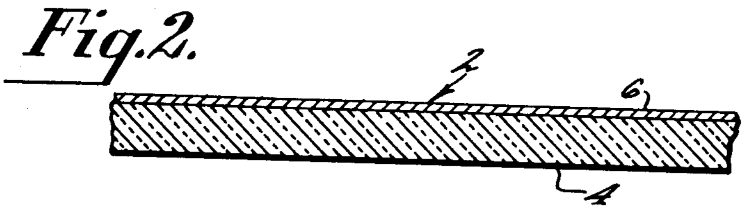
Fig. 2 is a cross-sectional view of a portion of magnetic recording tape.

In Fig. 2, there is shown a cross-section of a portion of magnetic recording tape 2. In the usual manner, this magnetic recording tape comprises a carrier base member 4 of a suitable flexible plastic material. The coating 6 of paramagnetic material will be on the order of .0005" in thickness.

Figure 3:
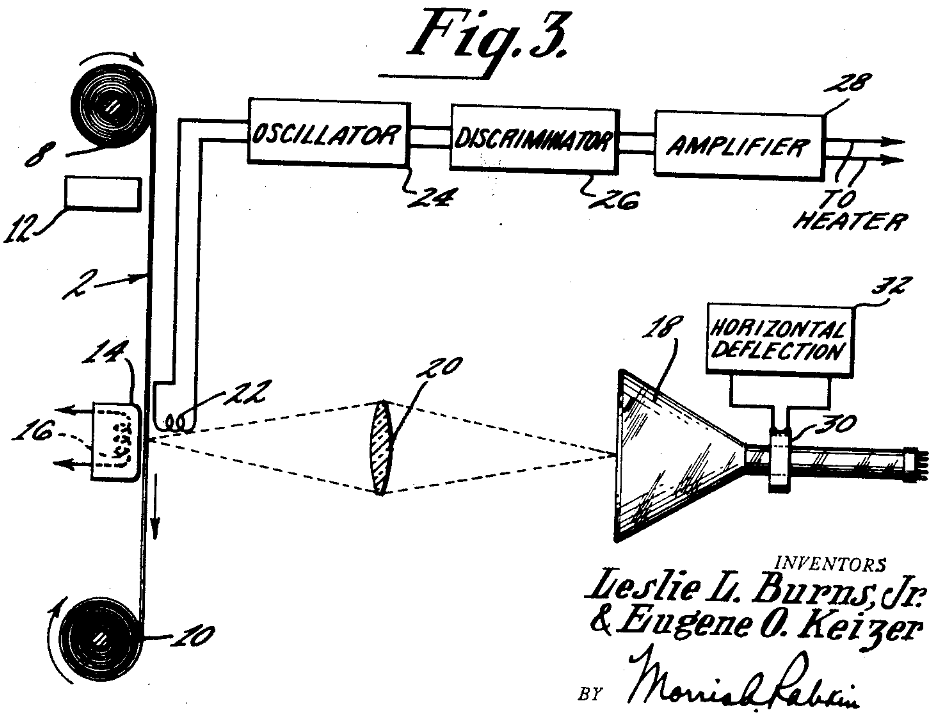
Fig. 3 is a schematic representation of a system according to the present invention.

In Fig. 3, there is illustrated a schematic representation of a system for effecting the recording of signals on magnetic tape in accordance with the present invention. A magnetic recording member, for example, a magnetic tape 2 is supplied from a supply reel 8 past a recording station and is then taken up on a takeup reel 10. As the tape 2 leaves the supply reel 8, it first passes a magnetizing station which may be, for example, a permanent magnet 12. At this point, an initial uniform magnetization is impressed on the paramagnetic material constituting the coating 6 if a permanent magnet of a steadily exerted electromagnet is used. The tape 2 then advances to a preheating station 14. The preheating station 14 includes a heating element 16. This heating arrangement is adjusted to heat the paramagnetic material on the tape substantially up to the beginning of the Curie range illustrated as point A on the curve of Fig. 1.

With the magnetic material in the heated condition, additional energy corresponding to the signal to be recorded is applied to drive the temperature of the magnetic material into the Curie range of temperature, i.e., that range of temperature appearing between points A and B on the curve of Fig. 1. The added energy varies in accordance with the applied signal and, accordingly, the instantaneous temperature of selected areas on the record member is driven to various temperatures in the Curie range. As the temperature of the coating 6 is increased into this Curie range, the magnetization is diminished or obliterated in accordance with the excursion into the Curie range. Thus, if the added energy, or heat, is relatively large, approaching point B on the curve of Fig. 1, the residual magnetism is substantially completely obliterated. Whereas, if the added heat is very small, nearer to point A on the curve, the residual magnetism of the selected area of the tape 2 will be relatively unaffected. When the tape 2 has then passed from the heating zone and then cooled, the magnetic impression remaining on the tape 2 will be an image of the signal applied to the means for providing the added energy.

One example of means for providing such added energy is illustrated in Fig. 3. A cathode ray tube 18 has the beam thereof intensity modulated by the signal to be recorded. In this manner, the light energy emitted by the face of the tube will vary in accordance with the intensity modulation of the cathode beam. This operation is or may be in accordance with known television techniques. Light energy emanating from the face of the cathode ray tube 18 is concentrated and focused by means of a lens system 20 on the preheated tape 2. The cathode ray beam of the tube 18 may be deflected back and forth across the face of the tube in any known manner by any suitable means. Such means are represented schematically on the drawing by deflection yoke 30 connected to a suitable source of sawtooth deflection current 32. Beam deflection may be at television horizontal rate provided and controlled in any well known manner. Arrangements for producing beam excursion are, necessarily, a part of the present invention; and it is within the scope of the invention to omit beam deflection and take suitable precautions to avoid damage to the tube face by the stationary beam or stream of electrons. The light energy thus concentrated has sufficient heat energy content to provide the necessary additional heat to effect the partial demagnetization of the tape 2.

From the foregoing, it will be seen that television signals, for example, or other high frequency information could be recorded at considerably reduced tape speeds than heretofore provided in other recording systems. Because of the small grain size of the magnetic material constituting the coating 6, the inherent detail capability of the magnetic tape 2 is much better than that of photographic film, for example. In at least one instance, television picture information was recorded on magnetic recording tape in which an entire scan line of picture information occupied approximately .006" of linear space on a tape record. Magnetic recording techniques in accordance with the present invention may be used more effectively in the recording of video information than techniques heretofore used. If a magnetic record track 1/16" wide is used, a single scan line of video information may be impressed across the width thereof and still occupy 10 times as much space as that previously referred to. Assuming the conventional 3 by 4 aspect ratio, a full field of video information will occupy a space approximately 1/16 x 3/64". At the conventional rate of 60 fields per second, the tape would be advanced at the rate of 3" per second. By using a cathode ray beam to provide the added heat, the scanning of the beam in the horizontal direction in accordance with standard television horizontal scan rate, the concentrated heating spot may be caused to traverse horizontally across the tape 2 to lay down the horizontal scan lines on the record receiving member. Assuming the parameters just recited, the volume of the paramagnetic material to be heated per second is approximately .0001 of a cubic inch. This is approximately equal to .0016 cubic centimeters. Taking 0.5 as a maximum for the specific heat of a particular chosen paramagnetic material, we find that less than .001 gram-calories of heat energy must be supplied for each degree of temperature rise desired. This amounts to no more than approximately a .005 watt of absorbed heat energy. If the maximum change in temperature from A to B on the curve of Fig. 1 is on the order of 2°, then 100% recording modulation could be accomplished by signal power of as little as .01 watt. Experience has taught that the light emanating from the face of a kinescope type cathode ray tube is sufficient to supply more than 100 times this amount of energy.

Also shown in Fig. 3 is a coil 22 connected to and forming a part of an oscillator 24. The output of the oscillator 24 is fed to a discriminator 26 and thence to an amplifier 28. The output of the amplifier 28 is connected to the heater element 16 of the preheating station 14. The coil 22 and the oscillator 24 are so tuned that a proper temperature of the tape 2 when heated by the heating station 14 will leave the oscillator 24 unaffected. If the heater tends to overheat the tape 2, the magnetic coupling between the oscillator coil 22 and a separate track on the record member is varied by virtue of the tendency of the tape 2 to become demagnetized. This change in the coupling produces a corresponding change in the oscillator output, which change is detected by the discriminator 26. The detected difference is fed to the amplifier 28 and thence used to control the operation of the heater in a direction to prevent the overheating of the tape 2.

It will, of course, be recognized by those skilled in the art that other variations in the application of the present recording technique are feasible other than those heretofore set out. For example, if the system were used for recording a sound signal, the cathode ray beam could be deflected at a high frequency not necessarily related to the recording signal but at a frequency substantially higher than the highest frequency component of the signal and the signal may be used to modulate either the intensity of the beam or alternatively the amount of the deflection.

What is claimed is:

1. Apparatus for recording signals on a magnetic record receiving member comprising means for magnetizing said record receiving member, and means responsive to signals to be recorded for thermally demagnetizing selected portions of said record receiving member.

2. Apparatus for recording signals on a magnetizable record receiving member comprising means for uniformly magnetizing said member, a source of signals, means for thermally demagnetizing selecting portions of said record receiving member, and means for controlling said last named means by said signal source.

3. Apparatus for recording signals on a magnetic record receiving member comprising means for uniformly magnetizing the record receiving member, means for heating said record receiving member to the range of Curie temperatures, and means for modulating the heating means in accordance with signals to be recorded.

4. Apparatus for recording signals on a magnetic record receiving member comprising means for uniformly magnetizing said record receiving member, means for preheating said record receiving member to a temperature at the beginning of the range of Curie temperatures, means for adding heat to further heat said record receiving member into the range of Curie temperatures, and means for modulating the added heat in accordance with the signals to be recorded.

5. Apparatus for recording signals on a magnetic record receiving member comprising means for uniformly magnetizing the record receiving member, means for preheating the magnetized record receiving member to a temperature at the beginning of the range of Curie temperatures, a source of light energy, means for modulating light from said source in accordance with signals to be recorded, means for focusing said modulated light on the preheated record receiving member whereby to add heat according to said modulated light to further heat said record receiving member into said range of Curie temperatures.

6. Apparatus for recording signals on a magnetic record receiving member comprising means for uniformly magnetizing the record receiving member, a first heating means for heating said record receiving member to a temperature at the beginning of the range of Curie temperatures, a second heating means for further heating said record receiving member into the range of Curie temperatures, said second heating means comprising a source of light energy, and means for modulating said light energy in accordance with signals to be recorded.

7. The invention as set forth in claim 6 wherein said light source a cathode-ray tube.

8. The invention as set forth in claim 6 characterized by the addition of means responsive to the heating of said record receiving member for controlling the energization of said first heating means.

References Cited in the file of this patent

UNITED STATES PATENTS 2,535,497 Jones ---------------- Dec. 26, 1950